US012506341B1

(12) United States Patent
Awal et al.

(10) Patent No.: US 12,506,341 B1
(45) Date of Patent: Dec. 23, 2025

(54) AGILE GRID FORMING CONTROL FOR COMPENSATING COLLOCATED EXTREME LOAD VARIABILITY

(71) Applicant: EPC Power Corporation, Poway, CA (US)

(72) Inventors: M A Awal, Poway, CA (US); David Michaud, Poway, CA (US); William Giewont, Poway, CA (US); Devin Dilley, Poway, CA (US)

(73) Assignee: EPC POWER CORPORATION, Poway, CA (US)

( * ) Notice: Subject to any disclaimer, the term of this patent is extended or adjusted under 35 U.S.C. 154(b) by 10 days.

(21) Appl. No.: 19/079,234

(22) Filed: Mar. 13, 2025

(51) Int. Cl.
*H02J 3/32* (2006.01)
*H02J 3/00* (2006.01)
*H02J 3/40* (2006.01)

(52) U.S. Cl.
CPC ............... *H02J 3/32* (2013.01); *H02J 3/003* (2020.01); *H02J 3/40* (2013.01); *H02J 2203/20* (2020.01); *H02J 2310/16* (2020.01)

(58) Field of Classification Search
CPC ...... H02J 3/32; H02J 3/003; H02J 3/40; H02J 2203/20; H02J 2310/16
See application file for complete search history.

(56) References Cited

U.S. PATENT DOCUMENTS

| | | | |
|---|---|---|---|
| 10,756,570 B2* | 8/2020 | Lundstrom | H02J 3/381 |
| 2012/0310427 A1* | 12/2012 | Williams | H02J 13/00028 |
| | | | 702/182 |
| 2013/0184884 A1* | 7/2013 | More | F03D 7/00 |
| | | | 290/44 |
| 2014/0070617 A1* | 3/2014 | Detmers | H02J 7/0071 |
| | | | 307/64 |
| 2014/0070756 A1* | 3/2014 | Kearns | H02J 13/00034 |
| | | | 320/101 |
| 2014/0172503 A1* | 6/2014 | Hammerstrom | G05B 15/02 |
| | | | 705/7.31 |
| 2014/0214227 A1* | 7/2014 | Thornton | G05B 15/02 |
| | | | 700/295 |
| 2014/0297206 A1* | 10/2014 | Silverman | H02J 13/00034 |
| | | | 702/58 |
| 2016/0226249 A1* | 8/2016 | Sakuma | H02J 13/00034 |
| 2020/0106294 A1* | 4/2020 | Wenzel | H02S 40/32 |
| 2020/0106385 A1* | 4/2020 | Wenzel | H02S 40/32 |
| 2021/0006073 A1* | 1/2021 | Donahue | G01R 19/16547 |
| 2021/0167603 A1* | 6/2021 | Valcan | F03D 7/0284 |
| 2023/0024900 A1* | 1/2023 | Ayoola | B60L 55/00 |
| 2023/0120165 A1* | 4/2023 | Hansen | H02J 3/004 |
| | | | 700/286 |

* cited by examiner

*Primary Examiner* — Ziaul Karim
(74) *Attorney, Agent, or Firm* — Foley & Lardner LLP

(57) ABSTRACT

An agile grid forming control system for power electronics converters integrates a dual-time scale control strategy to provide grid-forming operation while compensating for extreme power demand variations. A high-speed digital processor collects real-time electrical measurements at a point of interconnection and dynamically adjusts power output to stabilize grid conditions. The system is particularly suited for AI data centers, microgrids, and other applications with high-variability loads. The system enhances grid stability, enables efficient energy storage integration, and reduces reliance on bulk grid infrastructure.

18 Claims, 4 Drawing Sheets

AGILE GRID FORMING CONTROL FOR COMPENSATING COLLOCATED EXTREME LOAD VARIABILITY

BACKGROUND

Current grid-forming inverters and power converter technologies have limitations in handling extreme, rapid fluctuations in power demand, particularly in applications such as AI data centers. Traditional grid-following and grid-forming approaches are not optimized for systems with high load variability and energy storage dependency. These conventional solutions struggle with maintaining stability and efficient operation under rapid load swings, leading to system inefficiencies, potential instability, and increased reliance on external grid infrastructure.

The present disclosure addresses these shortcomings by introducing a control strategy that seamlessly integrates both grid-forming and agile load-compensation functionalities while ensuring stable operation even in the absence of a bulk grid connection.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing.

DETAILED DESCRIPTION

Figure 1:
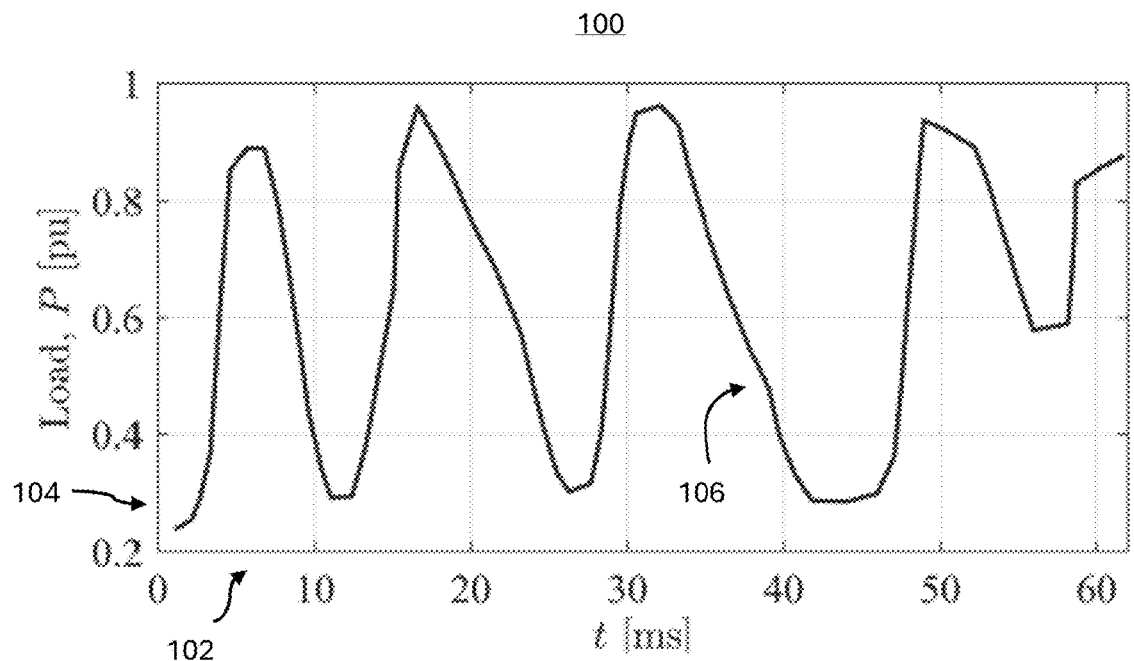
FIG. 1 is a representative load profile of a server cluster dedicated for generative AI applications.

In the following description, reference is made to the accompanying drawings, which form a part hereof. In the drawings, similar symbols typically identify similar components, unless context dictates otherwise. The illustrative embodiments described in the description, drawings, and claims are not limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

The growing push towards infrastructure for generative artificial intelligence (AI) has led to data centers with power demand of unprecedented scale. Furthermore, such datacenters dedicated for generative AI exhibit extreme variability in their power demand. Despite recent efficiency gains in pre- and post-training of large-language models (LLMs) and reasoning models, emerging applications such as agentic AIs are expected to usher exponential growth in demand for AI infrastructure, i.e., larger power demand by data centers.

Gigawatt scale data-center sites are currently under development and even larger sites are expected to emerge in the longer term. As a critical infrastructure for national security and productivity, most AI data centers are unlikely to serve as load modifying resources (LMRs). Moreover, emerging data centers dedicated for generative AI models exhibit markedly distinct load profiles from that of their legacy counterparts such as flat-use data centers, i.e., fixed server loads with daily or seasonal variation and mixed-use data centers, i.e., flat-use load superposed with regular building load profile.

With reference to FIG. 1, a representative load profile 100 of an AI server cluster is illustrated. The horizontal axis 102 represents time in milliseconds (ms), while the vertical axis 104 represents normalized load power. The load profile 100 exhibits extreme variability, with rapid fluctuations occurring within milliseconds. These fluctuations can range from approximately 20% to 100% of peak load, as shown by the variable curve 106. Such extreme load variability presents significant challenges for grid stability and reliability.

Conventional grid control systems typically operate at time scales of hundreds of milliseconds or longer, making them inadequate for responding to the millisecond-scale fluctuations exhibited by AI data centers. This disparity in time scales creates a critical need for faster response capabilities to maintain grid stability. Additional to such load variation under nominal operation, data center loads have been observed to exhibit abrupt load pick-up and load drop-off in response to upstream grid events, such as over-/under-voltage events, which substantially deteriorate the frequency and voltage recovery after the contingency. A collocated ESS using the system described herein can serve both the data center and the grid operator as it can guarantee uninterrupted and reliable power for the data center during such grid contingencies and can provide frequency response and voltage regulation services for the system operator to augment grid stability.

Figure 2:
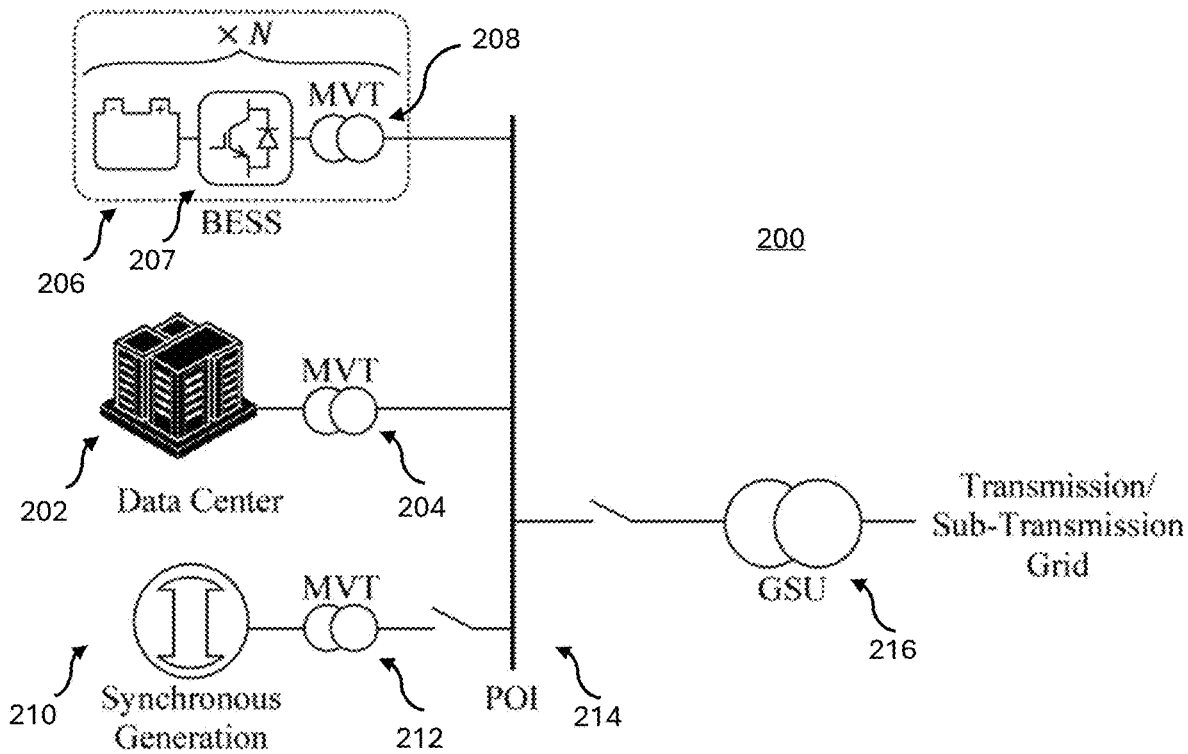
FIG. 2 is an illustrative data center with a collocated BESS according to one embodiment.

Referring to FIG. 2, a system configuration 200 includes a data center 202 with collocated energy storage and generation resources. The data center 202 connects to a medium voltage (MV) distribution grid through a medium voltage transformer (MVT) 204. The system includes a battery energy storage system (BESS) 206 comprising multiple units, each connected to the MV grid through inverters 207 and MVTs 208. Each BESS unit includes power electronics converters for interfacing with the AC network. While the system is illustrated as including the BESS 206, other energy storage systems can be used, such as compressed air, thermal storage, pumped hydro, supercapacitors, and flywheels. The system may also include synchronous generation 210 connected to the MV grid through an MVT 212. The synchronous generation 210 can be a gas generator, a diesel generator, or other power source. The ESS, collocated generation, and the load may be connected to a low voltage AC grid without requiring the respective medium-voltage transformers.

All components connect at a Point of Interconnection (POI) 214, which interfaces with a transmission, sub-transmission, or a distribution grid through a generation step-up (GSU) transformer 216. This configuration allows for operation when connected to or isolated from the main grid.

At power levels upwards of several MWs, the BESS 206 connects to the transmission or sub-transmission grid at the point of interconnection (POI) 214 through the GSU transformer 216. The inverters 207 (e.g., hundreds of inverter units/skids, typically rated between hundreds of kW to several MWs), connect to the medium voltage (MV) site distribution grid—each through a separate MVT of the MVTs 208. In an example, each unit of the BESS 206 is coupled to an inverter of the inverters 207 which is coupled to an MVT of the MVTs 208 to connect the unit of the BESS 206 to the MV grid. The system can be configured to operate in absence of the bulk AC grid using the synchronous generation 210 (e.g., gas/diesel generators). A power plant controller (PPC) commands the inverters 207 based on measured voltage and current signals at the POI 214, commands from the respective grid-operator, and the state of energy (SOE) (e.g., state of charge (SOC) in case of a battery energy storage system (BESS)), obtained from energy management systems (EMSs) associated with the BESS 206.

Note that the PPC commands to the inverters 207 are updated at slower time scales ranging in hundreds of ms. In light of the challenges contextualized in the preceding section, two separate time scales of interest can be identified: 1) a few ms to tens of ms within which server clusters exhibit extreme load variability, and the PPC action is ineffective at such speed; 2) hundreds of ms to a longer time horizon. The first time scale (e.g., 3-50 ms) is too short for the PPC action to be effective, as the PPC commands to the inverters 207 are updated at time scales ranging in hundreds of ms. The second time scale (e.g., 150-10,000 ms) is critical to ensure continuous service (i.e., maintain SOE of the ESS within operating range).

Figure 3:
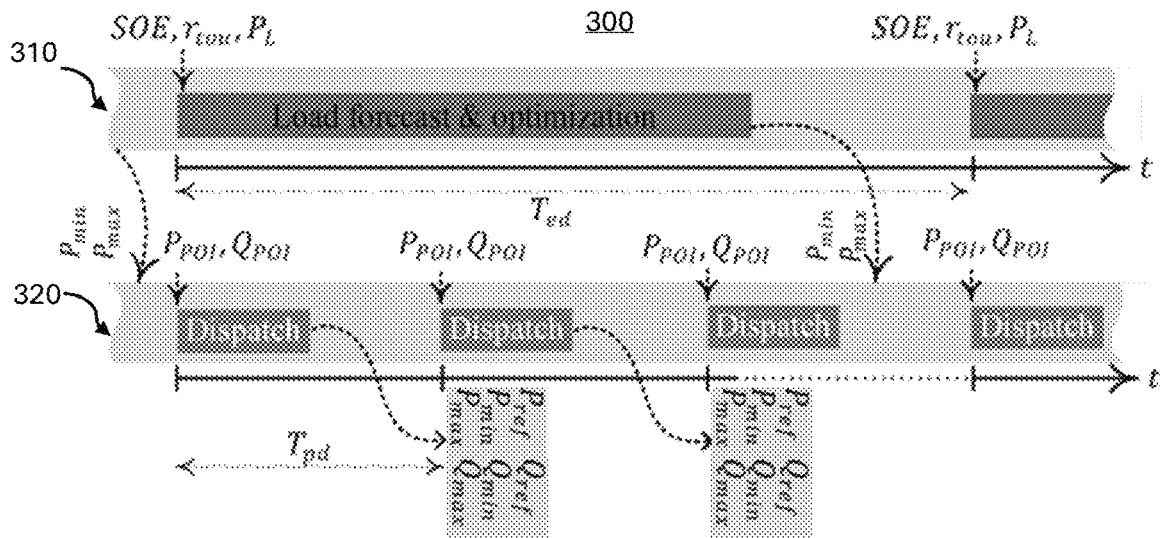
FIG. 3 is an illustration of energy dispatch by a power plant controller over a low-speed communication link according to another embodiment.

With reference to FIG. 3, the energy and power dispatch process 300 operates at two distinct time scales. At the slower time scale 310, energy dispatch occurs at intervals of Ted, typically ranging from hundreds of milliseconds to minutes. At each interval, the system uses state of energy (SOE) (e.g., SOC) information, time-of-use electricity rates ($r_{tou}$), and load power ($P_L$) to perform load forecasting and optimization.

At a faster time scale 320, power dispatch occurs at intervals of $T_{pd}$, typically in the range of tens to hundreds of milliseconds. The system measures real and reactive power ($P_{POI}$, $Q_{POI}$) at the POI and performs dispatch operations to produce power references ($P_{poi,ref}$, $Q_{poi,ref}$) and power limits ($P_{min}$, $P_{max}$). The system can provide the power references and power limits to the inverters 207 of FIG. 2 to control an output of the inverters 207.

The energy dispatch process determines allowable charging and discharging limits for the energy storage system, ensuring that the state of energy remains within desired limits ($SOE_{min}$, $SOE_{max}$) while minimizing electricity purchase costs. The power dispatch process ensures that the system operates within these limits while responding to immediate power needs. The energy and power dispatch process 300 can be a combination of the energy dispatch process and the power dispatch process. In some implementations, the energy dispatch is performed by a power plant controller (PPC) and the power dispatch is performed by a POI processor (i.e., digital processor. In some implementations, the energy dispatch and the power dispatch are performed by a dispatch controller. In some implementations, the POI processor and the PPC are components of a dispatch controller. In some implementations, the functionality and/or operations of the POI processor and the PPC as described herein are performed by a dispatch controller.

Figure 4:
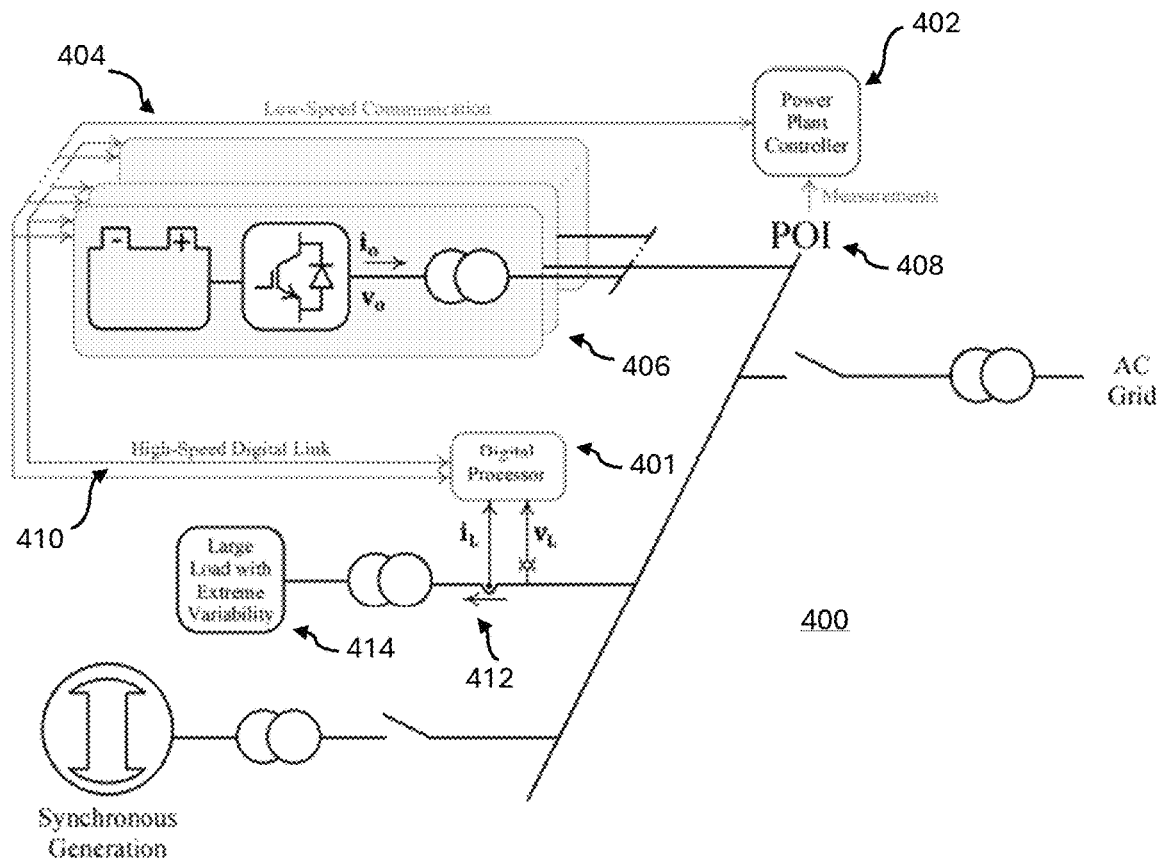
FIG. 4 is an illustrative diagram showing an agile grid forming control according to yet another embodiment.

FIG. 4 illustrates an exemplary system 400 of agile grid forming control. The system 400 includes a Power Plant Controller (PPC) 402 that communicates with inverter units of a BESS 406 over a conventional low-speed communication link 404. This link 404 typically operates at data rates of kilobits per second, limiting its responsiveness to rapid fluctuations. In addition, the system 400 includes a POI processor 401 that obtains measurements (e.g., voltage, current) at the POI 408 and communicates with controllers in each inverter unit of the BESS 406 over a high-speed digital link 410. The POI processor 401 can generate electrical reference quantities for rapid response to load variation based on the measurements. The POI processor 401 can generate control signals for the inverters of the BESS 406 based on the electrical reference quantities. The high-speed link 410 operates at data rates ranging from fractional to hundreds of Megabits per second, enabling response times on the order of milliseconds. In some implementations, the POI processor 401 obtains the measurements at the POI 408. In some implementations, the POI processor 401 obtains the measurements directly from the load terminal 412 of a variable load 414 (e.g., a datacenter). In some implementations, the POI processor 401 obtains the measurements from the POI 408 and the load terminal 412. In some implementations, the POI processor 401 and the PPC 402 are components of a dispatch controller. In some implementations, the functionality and/or operations of the POI processor 401 and the PPC 402 are performed by a dispatch controller of the system 400.

Figure 5:
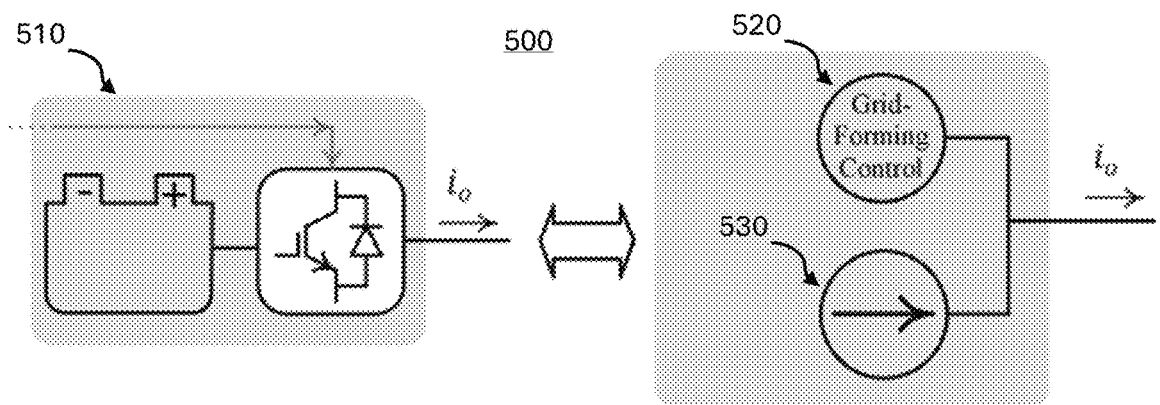
FIG. 5 is an illustrative diagram showing an agile grid-forming controlled ESS equivalent to an AC grid-forming source combined with a reference-tracking current/power source according to one embodiment.

FIG. 5 conceptually represents the equivalent operation 500 of an agile grid-forming-controlled energy storage system (ESS) 510. The ESS 510 effectively operates as a parallel combination of a grid-forming controlled source 520 and a reference-tracking current/power source 530. The reference-tracking current/power source 530 can provide ancillary services such as reserve generation and frequency control to the utility grid. This parallel operation enables simultaneous provision of grid support services (i.e., ancillary services) and compensation for load variability. The ESS 510 may be the same as or similar to the BESS 406 of FIG. 4. The POI processor 401 and the high-speed link 410 between the POI processor 401 and the inverters of the BESS 406 may enable the BESS 406 to effectively operate as a parallel combination of a grid-forming controlled source and a reference-tracking current/power source. Similar components may allow the ESS 510 to effectively function as a parallel combination of the grid-forming controlled source 520 and the reference-tracking current/power source 530.

Figure 6:
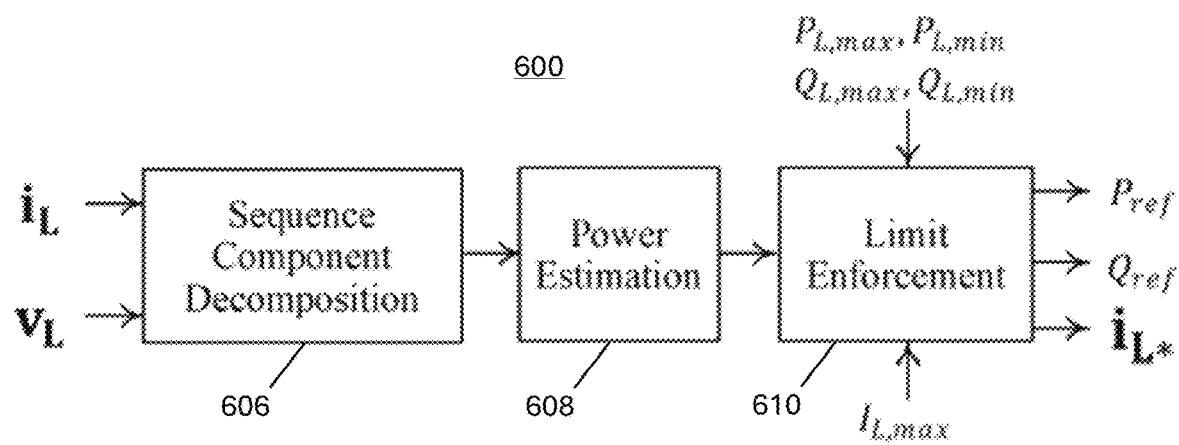
FIG. 6 is an illustrative diagram showing reference generation using measurement at a load terminal according to one embodiment.

Referring to FIG. 6, a reference generation process 600 uses measurements of load current ($i_L$) and load voltage ($V_L$) at a load terminal or a POI. The measurements undergo sequence component decomposition 606 followed by power estimation 608. The resulting power estimates are subject to limit enforcement 610 based on power limits ($P_{L,max}$, $P_{L,min}$, $Q_{L,max}$, $Q_{L,min}$) and current limit ($I_{L,max}$). The reference generation process produces real and reactive power references ($P_{ref}$, $Q_{ref}$) and instantaneous current reference ($i_{L*}$). These references are used by the control system to generate appropriate control signals for the power electronics converters. In some implementations, these references are the electrical reference quantities generated by the POI processor 401 of FIG. 4.

Figure 7:
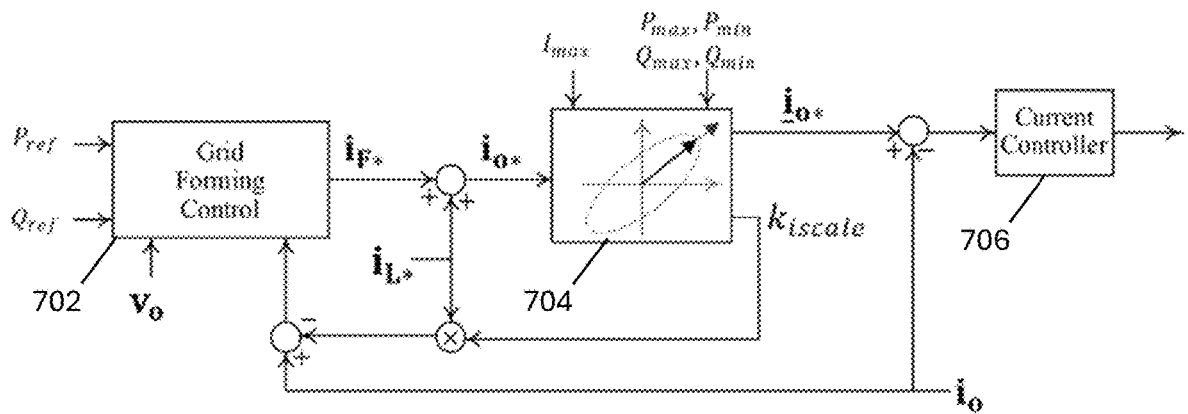
FIG. 7 is an illustrative diagram showing a representative implementation of an agile grid-forming control according to one embodiment.

FIG. 7 is an illustrative diagram showing a representative implementation of agile grid-forming control. The system receives power references ($P_{ref}$, $Q_{ref}$) and generates a forming current reference ($i_{F*}$) using grid-forming control 702. In some implementations, the grid-forming control 702 uses the inverter terminal voltage $v_o$ but does not use the total inverter output current $i_o$ for estimating the output power. This reference is combined with the load-compensating current reference ($i_{L*}$) to form a total current reference ($i_{o*}$). The total current reference ($i_{o*}$) is subject to limits imposed by current limit ($I_{max}$) and power limits ($P_{max}$, $P_{min}$, $Q_{max}$, $Q_{min}$) through a limiting function 704. The limiting function produces a scaling factor ($k_{iscale}$) that is applied to generate the appropriate total output current reference ($i_{o*}$) that respects various limits imposed on the inverter. The output current feedback used by the grid-forming controller is generated using the measured inverter output current $i_o$ and the load compensating current reference ($i_{L*}$) as ($i_o - k_{iscale} \times i_{L*}$), i.e., current output of the equivalent grid-forming source. As discussed in conjunction with FIG. 5, the equivalent grid-forming source can be a conceptual aspect of an ESS. In the example illustrated in FIG. 5, the grid-forming control source 520 is a conceptual aspect of the ESS 510, as the ESS 510 effectively functions as a parallel combination of the grid-forming control source 520 and the reference-tracking current/power source 530. A current controller 706 then produces the final control signals for the power electronics converters based on the limit-enforced total output current reference $i_{o*}$.

Embodiment 1: Data Center with Collocated BESS

In one embodiment, the system includes a data center with a collocated battery energy storage system (BESS). The BESS includes multiple inverter units connected to a medium voltage distribution grid, each with local processing capabilities. A POI processor obtains measurements at the POI and communicates with the inverter units over high-speed digital links.

The BESS compensates for the extreme load variability of the data center, shielding the main grid from rapid fluctuations. The control enables the BESS to simultaneously provide grid support services and load compensation.

Embodiment 2: Isolated Operation with Synchronous Generation

In another embodiment, the system operates in isolation from the main grid, relying on collocated synchronous generation (such as gas or diesel generators) and energy storage. The control enables stable operation by compensating for load variability that would otherwise challenge the synchronous generators.

The POI processor obtains measurements at the load terminal of the data center and communicates with the inverter units over high-speed digital links. The energy storage system responds rapidly to load fluctuations, allowing the synchronous generators to operate at more stable power levels.

Embodiment 3: Hybrid System with Multiple Energy Storage Technologies

In yet another embodiment, the system includes multiple energy storage technologies with different characteristics. For example, a combination of supercapacitors for rapid response and batteries for longer-duration storage.

The control coordinates the operation of these different storage technologies, directing high-frequency power fluctuations to the supercapacitors while managing longer-term energy balance using the batteries. The high-speed digital links enable precise coordination among the different storage units.

Variation 1: Measurement Location

While the exemplary embodiments describe measurements taken at the POI or load terminal, the system may obtain measurements at various locations within the electrical network. For example, measurements could be taken at the medium voltage bus, at the terminals of individual storage units, or at multiple points throughout the network.

The POI processor can combine measurements from multiple locations to generate more comprehensive reference quantities for improved control performance.

Variation 2: Communication Architecture

The communication architecture may vary depending on specific requirements and constraints. In some embodiments, the POI processor may communicate directly with each inverter unit. In other embodiments, a hierarchical communication structure may be employed, with intermediate processors aggregating and relaying information.

The high-speed digital links may use various communication protocols and physical media, including but not limited to fiber optic, Ethernet, or specialized industrial communication networks.

Variation 3: Control Algorithms

The specific control algorithms implemented within the framework may vary. Different grid-forming control strategies may be employed, including virtual synchronous machine approaches, droop control, or other techniques. Similarly, various current and power control algorithms may be used for the reference-tracking component. The system may adapt its control strategy based on operating conditions, switching between different algorithms as needed to optimize performance.

IMPLEMENTATION EXAMPLES

Example 1: Gigawatt-Scale AI Data Center

In a practical implementation for a gigawatt-scale AI data center, the AGFM control system includes:
  A 500 MW/1000 MWh battery energy storage system comprising 250 inverter units, each rated at 2 MW.
  A POI processor with high-speed digital signal processing capabilities, sampling electrical quantities at 10 kHz.
  High-speed digital links operating at 100 Mbit/s, enabling communication latency under 1 ms.
  A power plant controller operating at 1-second intervals for energy management.
  Local processors at each inverter unit, executing control algorithms at 10 kHz.

With this implementation, the system can respond to load fluctuations within 5 ms, effectively compensating for the extreme variability exhibited by the AI data center. The energy storage system simultaneously provides grid support services, including frequency response and voltage regulation.

Example 2: Remote Data Center with Limited Grid Connection

For a remote data center with limited grid connection capacity, the AGFM control system includes:
  A 100 MW/200 MWh battery energy storage system.
  50 MW of collocated synchronous generation.
  A POI processor with redundant measurement systems for enhanced reliability.

High-speed digital links operating at 50 Mbit/s.

A power management system that prioritizes critical loads during extended grid outages.

This implementation enables the data center to operate reliably despite the limited grid connection, with the AGFM control system managing the interaction between the energy storage, local generation, and the grid. During grid outages, the system transitions seamlessly to isolated operation, maintaining stability through precise coordination of the available resources.

Example 3: Hybrid Energy Storage System

For applications requiring extremely fast response capabilities, a hybrid energy storage system includes:
 20 MW/5 MWh of supercapacitors for millisecond-response requirements.
 100 MW/400 MWh of batteries for longer-duration storage.
 A POI processor with advanced signal processing for frequency decomposition.
 High-speed digital links operating at 1 Gbit/s for minimal latency.
 Control algorithms that direct high-frequency power fluctuations to the supercapacitors and lower-frequency components to the batteries.

This implementation achieves response times under 1 ms for the highest-frequency fluctuations, with the AGFM control system seamlessly coordinating the operation of the different storage technologies. The result is enhanced stability and reliability, even in the face of the most extreme load variability.

Figure 8:
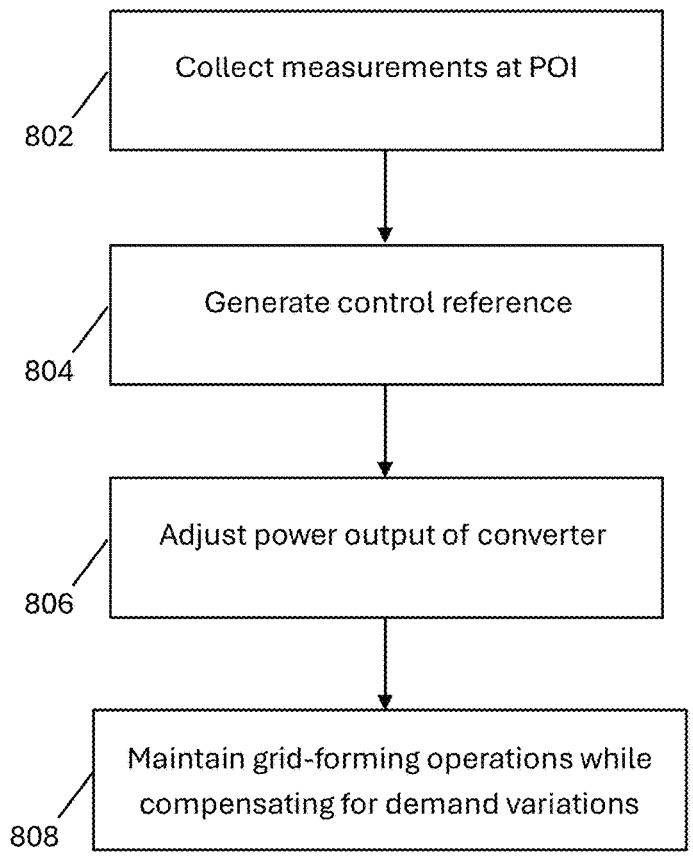
FIG. 8 is a flow chart illustrating example operations of a method of an agile grid-forming control according to one embodiment.

FIG. 8 is a flow chart illustrating example operations of a method of an agile grid-forming control. Additional, fewer, or different operations may be performed depending on the embodiment. The method may be performed by processing circuitry within the POI processor and local processors at power electronics converters. The method may be performed by the POI processor 401 of FIG. 4.

At operation 802, the system collects real-time electrical measurements at a point of interconnection (POI) or at a terminal of a variable load. These measurements may include, but are not limited to, voltage measurements, current measurements, frequency measurements, phase measurements, and derived quantities such as real and reactive power. The measurements are taken at a high sampling rate, typically in the range of 1-20 kHz, to capture rapid fluctuations in the electrical quantities.

At operation 804, the system generates dynamic control references based on the real-time electrical measurements. This operation may include multiple sub-processes, such as decomposing the measurements into sequence components, estimating power components, applying appropriate filtering to separate different frequency components, and calculating reference values according to predefined control objectives.

The generated references include electrical reference quantities such as real power reference ($P_{ref}$), reactive power reference ($Q_{ref}$), and instantaneous current reference ($i_{L*}$). These references are transmitted to local processors at each power electronics converter via high-speed digital links operating at data rates ranging from fractional to hundreds of Megabits per second. The high-speed communication enables rapid response to load fluctuations, with minimal latency between measurement and control action.

At operation 806, the system adjusts power output of the power electronics converters in response to rapid load fluctuations. This adjustment occurs at a time scale of milliseconds, allowing the system to compensate for the extreme variability exhibited by AI data centers and other highly variable loads.

The power output adjustment is performed by modifying the switching patterns of semiconductor devices within the power electronics converters. Advanced modulation techniques ensure high fidelity tracking of reference values while maintaining low harmonic distortion. The adjustment process includes appropriate current and power limiting to protect the equipment from overload conditions.

At operation 808, the system maintains grid-forming operation while compensating for power demand variations. This dual functionality is a key aspect of the control, enabling the system to simultaneously provide grid support services and load compensation.

The grid-forming operation includes maintaining stable voltage and frequency at the point of common coupling, providing inertial response to system disturbances, and supporting voltage regulation. Meanwhile, the load compensation function absorbs the rapid fluctuations from the variable load, preventing these fluctuations from propagating through the electrical system.

The method may include additional operations not explicitly shown in FIG. 8, such as fault detection and response, mode transitions between grid-connected and islanded operation, coordination with other generating resources, and long-term energy management to ensure the state of energy of the storage system remains within acceptable limits.

The operations described may be performed continuously during system operation, with different aspects updating at different rates according to their time criticality. For example, current control loops may operate at tens of kilohertz, while energy management functions may update at intervals of seconds or minutes.

The agile grid forming control system represents a significant advancement in the management of grid-interactive power electronics converters, particularly for applications involving extreme load variability. By combining grid-forming capabilities with rapid response to load fluctuations, the system enhances stability and reliability while shielding the electrical grid from potentially destabilizing effects.

The use of high-speed digital communication links enables response times on the order of milliseconds, far outperforming conventional control systems. This capability is particularly valuable for modern data centers dedicated to artificial intelligence applications, which exhibit unprecedented levels of load variability at increasingly higher power levels.

While specific embodiments and examples have been described, numerous variations and modifications are possible within the scope of the invention. The specific control algorithms, communication protocols, and system configurations may be adapted to particular requirements and constraints without departing from the fundamental principles of the invention.

What is claimed is:

1. A method for controlling a grid-interactive power electronics converter, the method comprising:
  collecting, by a dispatch controller, real-time electrical measurements at a point of interconnection (POI) or a terminal of a variable load;
  generating, by the dispatch controller, based on the real-time electrical measurements, a forecast of energy demand for the variable load;

generating, by the dispatch controller, dispatch limits for the power electronics converter at a first dispatch frequency based on the forecast of energy demand for the variable load;

generating, by the dispatch controller, dispatch controls for the power electronics converter at a second dispatch frequency based on the dispatch limits and the real-time electrical measurements, wherein the second dispatch frequency is greater than the first dispatch frequency;

controlling, by the dispatch controller, the power electronics converter using the dispatch controls; and adjusting, by the dispatch controller, power output of the power electronics converter from one to hundreds of milliseconds to compensate for load variability comprising power fluctuations ranging from 20% to 100% of peak load.

2. The method of claim 1, wherein generating the dispatch controls includes:
generating, by the dispatch controller, electrical reference quantities based on the real-time electrical measurements wherein the dispatch controls include the electrical reference quantities.

3. The method of claim 1, wherein generating the dispatch controls includes:
generating, by the dispatch controller, electrical reference quantities based on the real-time electrical measurements, wherein the dispatch controls are generated based on the dispatch limits and the electrical reference quantities.

4. The method of claim 1, wherein generating the dispatch controls includes:
generating, by the dispatch controller, electrical reference quantities based on the real-time electrical measurements by:
generating a forming current reference using grid-forming control;
combining the forming current reference with a load-compensating current reference to form a total current reference; and
generating a total output current by modifying the total current reference using a scaling factor calculated using the dispatch limits.

5. The method of claim 1, wherein the power electronics converter is coupled to an energy storage system (ESS), and wherein the dispatch limits allow the ESS to provide ancillary services to a utility grid.

6. The method of claim 1, wherein the variable load exhibits power fluctuations in the millisecond range.

7. The method of claim 6, wherein the first dispatch frequency is less than or equal to once every hundred milliseconds, and wherein the second dispatch frequency is greater than or equal to once every ten milliseconds.

8. The method of claim 1, further comprising operating the power electronics converter in isolation from a utility grid.

9. The method of claim 1, wherein the variable load comprises a data center configured for artificial intelligence applications.

10. A control system for grid-interactive power electronics converters, comprising:
a power electronics converter configured to interface with an energy storage system (ESS); and
a dispatch controller configured to:
collect real-time electrical measurements at a point of interconnection (POI);
generate, based on the real-time electrical measurements, a forecast of energy demand for a variable load;
generate dispatch limits for the power electronics converter at a first dispatch frequency based on the forecast of energy demand for the variable load;
collect real-time electrical measurements at the POI or a terminal of a variable load;
generate dispatch controls for the power electronics converter at a second dispatch frequency based on the dispatch limits and the real-time electrical measurements, wherein the second dispatch frequency is greater than the first dispatch frequency;
control the power electronics converter using the dispatch controls; and
adjust power output of the power electronics converter from one to hundreds of milliseconds to compensate for load variability comprising power fluctuations ranging from 20% to 100% of peak load.

11. The control system of claim 10, wherein the dispatch controller is configured to generate the dispatch controls by:
generating electrical reference quantities based on the real-time electrical measurements, wherein the dispatch controls include the electrical reference quantities.

12. The control system of claim 10, wherein the dispatch controller is configured to generate the dispatch controls by:
generating electrical reference quantities based on the real-time electrical measurements, wherein the dispatch controls are generated based on the dispatch limits and the electrical reference quantities.

13. The control system of claim 10, wherein the dispatch controller is configured to generate the dispatch controls by:
generating electrical reference quantities based on the real-time electrical measurements by:
generating a forming current reference using grid-forming control;
combining the forming current reference with a load-compensating current reference to form a total current reference; and
generating a total output current by modifying the total current reference using a scaling factor calculated using the dispatch limits.

14. The control system of claim 10, wherein the dispatch limits allow the ESS to provide ancillary services to a utility grid.

15. The control system of claim 14, wherein the first dispatch frequency is less than or equal to once every hundred milliseconds, and wherein the second dispatch frequency is greater than or equal to once every ten milliseconds.

16. The control system of claim 10, wherein the variable load exhibits power fluctuations in the millisecond range.

17. The control system of claim 10, wherein the variable load is configured to be disconnected from a utility grid.

18. The control system of claim 10, wherein the variable load comprises a data center configured for artificial intelligence applications.

* * * * *